US012791183B2

(12) United States Patent
Röppänen et al.

(10) Patent No.: US 12,791,183 B2
(45) Date of Patent: Nov. 10, 2026

(54) WATER AND STEAM SEPARATOR OF A BOILER DRUM

(71) Applicant: ANDRITZ OY, Helsinki (FI)

(72) Inventors: Jukka Röppänen, Helsinki (FI); Hannu Karema, Vuorentausta (FI)

(73) Assignee: Andritz Oy, Helsinki (FI)

(*) Notice: Subject to any disclaimer, the term of this patent is extended or adjusted under 35 U.S.C. 154(b) by 532 days.

(21) Appl. No.: 18/552,109

(22) PCT Filed: Mar. 24, 2022

(86) PCT No.: PCT/FI2022/050190
§ 371 (c)(1),
(2) Date: Sep. 22, 2023

(87) PCT Pub. No.: WO2022/200690
PCT Pub. Date: Sep. 29, 2022

(65) Prior Publication Data

US 2024/0302036 A1 Sep. 12, 2024

(30) Foreign Application Priority Data

Mar. 25, 2021 (FI) ..................................... 20215337

(51) Int. Cl.
*F22B 37/26* (2006.01)
*B01D 45/12* (2006.01)
(Continued)

(52) U.S. Cl.
CPC ............ *F22B 37/261* (2013.01); *B01D 45/12* (2013.01); *B01D 45/16* (2013.01); *F22B 37/322* (2013.01)

(58) Field of Classification Search
CPC ...... F22B 37/261; F22B 37/322; B01D 45/12; B01D 45/16
See application file for complete search history.

(56) References Cited

U.S. PATENT DOCUMENTS 2,594,490 A 4/1952 Patterson
3,086,343 A 4/1963 Tobias
(Continued)

FOREIGN PATENT DOCUMENTS

CN 2752611 Y 1/2006
CN 104226022 A 12/2014
(Continued)

OTHER PUBLICATIONS

International Search Report for PCT/FI2022/050190 mailed Jul. 5, 2022, 5 pages.
(Continued)

*Primary Examiner* — Michael G Hoang
*Assistant Examiner* — Kurt J Wolford
(74) *Attorney, Agent, or Firm* — Nixon & Vanderhye P.C.

(57) ABSTRACT

A separator (1) of a boiler drum for separating steam and water, which separator (1) has a separating chamber (5) having a fluid inlet (2) at the bottom of the separating chamber (5) and a steam outlet (3) at the top of the separating chamber (5) and spiral vanes (9) are attached to the wall (6) of the separating chamber (5) between the fluid inlet (2) and the steam outlet (3) for accomplishing circular motion of the incoming fluids and wherein a circular water outlet (4) surrounds the steam outlet (3). Top end (8) of the wall (6) of the separating chamber (5) within the water outlet (4) has a rounded top contour for ensuring smooth flow and keeping a water trap (13) filled up at the top art of the water outlet (4) and is inclined inwards. The inclination at the top end (8) of the wall (6) is concave.

17 Claims, 3 Drawing Sheets

(51) Int. Cl.
*B01D 45/16* (2006.01)
*F22B 37/32* (2006.01)

(56) References Cited

U.S. PATENT DOCUMENTS

| | | | | | |
|---|---|---|---|---|---|
| 3,216,182 | A | | 11/1965 | Cochran et al. | |
| 3,329,130 | A | * | 7/1967 | Cochran | F22B 37/32 122/34 |
| 4,394,138 | A | | 7/1983 | Schilling | |
| 5,087,171 | A | | 2/1992 | Dosch et al. | |
| 5,130,082 | A | | 7/1992 | Oosterkamp | |
| 5,320,652 | A | * | 6/1994 | Akel | F22B 37/322 55/440 |
| 5,466,272 | A | | 11/1995 | Karlsson et al. | |

FOREIGN PATENT DOCUMENTS

| | | | | | |
|---|---|---|---|---|---|
| CN | 204756878 | U | | 11/2015 | |
| EP | 2250437 | B1 | | 7/2016 | |
| GB | 542610 | A1 | | 1/1942 | |
| GB | 664447 | A | | 1/1952 | |
| GB | 750198 | A | * | 6/1956 | B01D 45/12 |
| GB | 946909 | A | | 1/1964 | |
| JP | 48-34003 | B1 | | 10/1973 | |
| JP | S5885392 | A | | 5/1983 | |
| JP | 04-301796 | A | | 10/1992 | |
| JP | 06-509982 | A | | 11/1994 | |
| JP | H11141802 | A | | 5/1999 | |
| JP | 2001-174582 | A | | 6/2001 | |
| JP | 2001316993 | A | | 11/2001 | |
| JP | 2011-120999 | A1 | | 6/2011 | |
| JP | 2013-120068 | A | | 6/2013 | |
| WO | 9203611 | A1 | | 3/1992 | |

OTHER PUBLICATIONS

Written Opinion of the ISA for PCT/FI2022/050190 mailed Jul. 5, 2022, 6 pages.

Office Action for Japanese Patent Application No. 2021-530847 mailed Jun. 30, 2023, 8 pages (with English Translation).

Chinese Office Action cited in Application No. 202280019756.3 mailed Jan. 22, 2026, 14 pages.

* cited by examiner

WATER AND STEAM SEPARATOR OF A BOILER DRUM

RELATED APPLICATIONS

This application is the U.S. national phase of International Application PCT/FI2022/050190, filed Mar. 24, 2022, which designated the U.S. and claims priority to Finish patent application FI 20215337, filed Mar. 25, 2021, the entire contents of each of which are hereby incorporated by reference.

SCOPE OF THE INVENTION

The present invention relates to a steam and water separator, which separator has a separating chamber having a fluid inlet at the bottom of the separating chamber and a steam outlet at the top of the separating chamber.

BACKGROUND OF THE INVENTION

A boiler drum forms a part of a circulation system of a boiler. The drum serves two main functions, the first and primary one being that of separating steam from the mixture of water and steam. Secondly, the drum houses equipment used for purification of steam and water.

Two different types of cyclones are used to perform the basic separation of water and steam. A basic type has a tangential inlet, which makes the fluids rotate and lighter steam separates from water and exits from the top of the cyclone.

A vertical type of cyclonic separator has a bottom intake and spiral vanes turn the incoming fluid flow to circulating motion. The water phase will thus separate and flow sideways to the sides of separating chamber of the separator and flow up along inner wall of the separating chamber out to space between the separating chamber and outer wall of the separator. Steam exits from the top of the separator. Vertical types of separator are disclosed in publications U.S. Pat. No. 3,216,182, EP2250437, JPH11141802, U.S. Pat. No. 3,086,343, GB664447, U.S. Pat. Nos. 3,329,130 and 5,320,652.

SUMMARY OF THE INVENTION

As demands for operational efficiency of boilers continuously increase, also the inflow to the boiler drum increases and the efficiency of separation of steam has to be optimized. The prior art solutions create too high pressure difference and/or too much water will exit with steam and steam will also stay mixed to discharged water. Water within steam is not allowed to enter superheaters and further to steam turbine where it can cause harmful consequences. Steam bubbles in discharged water will cause small droplets of water within the drum as they break. Secondary demisters catch most of the droplets. This increases water loading of the secondary demister and consequently can influence flooding of it and water may enter the superheaters. Large amount of water entering into the superheaters might destroy them and in the worst-case, impurities with water droplets can enter all the way to steam turbine. Steam bubbles under the water surface will also worsen the control of water level and in the worst case be absorbed to downcomers and thus weaken driving head of natural cooling water circulation.

Widely used and other published vertical separators can separate water and steam effectively within the separating chamber. The main problem has not been the separation step but entering of steam to a water outlet. Water flow should happen smoothly and consistently within the water outlet for keeping the gas phase separated from the liquid phase. For example, top end designs of separating chambers of known separators have sharp-edged water paths at water outlets. The disclosure of U.S. Pat. No. 3,216,182 acknowledges the problem that steam enters into the water outlet and returns from there. Such return flow will comprise water droplets as the sharp changes in flow path creates them. The problem was solved by directing the mixture to a separate water/steam outlet, which is concentric with the water outlet. Entering of steam into the water outlet causes backward flow of water and steam mixture. That mixture should be separated again in demisters.

U.S. Pat. No. 3,329,130 discloses rounded top of top end of the wall of the separating chamber. Such slightly rounded end of the wall cannot prevent inducing highly turbulent flow at the top of the water outlet as the radius is too sharp to achieve remarkable flow path guiding effects.

Inconsistent or turbulent flow within the water outlet will open steam entrances deeper to the water outlet. Any steam entered within the outlet may also cause backwards bursts of water and steam mixture, causing water entering into the steam outlet. The present invention aims to prevent steam entering into the water outlet and mixing with water outflow. By avoiding any sharp changes in the flow path, the integrity of the flow is ensured. As the downwards path of water will be fully filled, inconsistence in gravitational sucking effect and thus changes in water throughflow will be avoided too. The present invention enables a more complete separation of water phase from steam phase without causing too high pressure drop over the separator. These and other objects that will be apparent from the following summary and description are achieved by a separator according to the appended claims.

The separator for a boiler drum for separating steam and water has a separating chamber having a fluid inlet at the bottom of the separator chamber and a steam outlet at the top center of the separating chamber. Spiral vanes are attached to the wall of the separating chamber between the fluid inlet and the steam outlet for accomplishing circular motion of the incoming fluids in order to separate water and steam phases. A circular water outlet is around the steam outlet.

The fast circular motion of fluids directs a flat upflow of water phase aside the separating chamber where light steam bubbles will move to the surface of the flow of water, where they will collapse. Steam will flow up the separation chamber to the top steam outlet. The upflow of water will have circular component and will best rise upwards, if the separating chamber has a top shape having an upwards increasing diameter. The upwards flowing water will form a thinning layer, which improves separation of steam. The steam outlet can then also have a larger initial diameter for lowering pressure drop. The drop of pressure is further reduced, if the steam outlet has a bottom shape, which has a smoothly upwards decreasing diameter.

The objective is to create a filled water trap having uniform barrier surface, which will prevent steam entering further to the water outlet. For achieving the objective, water should flow fluently within the water outlet for suppressing formation of turbulence, separate droplets or other inconsistencies of flow. Steam would otherwise have entrances into the water outlet between the droplets or separated flows. The water trap is aligned to an upside-down attitude, but it will work like a conventional one creating a stable barrier for gases. It will be filled by the continuous upflow of separated water. Therefore, there has to be a carefully designed channel for the water so that it will not drop back down from the water trap. Varying operating conditions will form different thickness of water layer, so the dimensions should be designed to suit for variety of operating conditions i.e. flow speeds and volumes. It is not possible to make any active adjustments of any vanes or any other parts during operation.

To achieve the objective the main new and most critical feature is the form of the top end of the wall of the separating chamber. The top end of the wall of the separating chamber within the water outlet has a rounded contour with a sufficiently big minimum radius. That cannot be achieved by just grinding the cut top end of the wall to small radius. The outflowing water will stay aside the top end without breaking to droplets or causing other discontinuities to the flow if it has a sufficient radius relative to flow speed around it. That is called the "teapot effect". Thus, the top part is not just an end of a cylinder or a cone, but a distinctive, integral part of the separator. If the top end of the wall of the separating chamber is formed from the wall of the separating chamber, the rounded form should continue at least over the top point, preferably at least 45 degrees over it.

The water trap within the water outlet is best kept filled and closed from steam by an inward inclined top end of the separating chamber. The design will form stable and uniform water surface behind the mouth of the water outlet against entering steam phase. The inclined top of the wall of the separating chamber directs the inflow smoothly against an opposite wall of the water outlet. The inwards inclination is preferably concave, so it will best direct the inflow smoothly against the opposite wall of the water outlet. The opposite side of the outlet should have a low contact angle against the surface of the inflow in order to avoid formation of droplets where the inflow contacts the opposite side.

The opposite outer walls of the water outlet around the top of the wall of the separating chamber of the water outlet should be smoothly curved for enabling smooth coherent flow of water through the water trap area. Any sharp edges would create discontinuities to the throughflow and so possible paths for steam.

Keeping the water trap filled is additionally ensured, if within behind the water trap within the water outlet, between the wall of the separating chamber and an outer wall of the separator is a plurality of guiding vanes, which are aligned downwards to an opposite pitch angle related to the spiral vanes. The vanes divert the throughflow to more horizontal direction thus causing slight backpressure. As the water outlet aside of the separating chamber will thus be full of water only, it can create effective gravitational sucking effect. That partially compensates the pressure drop caused by the guiding vanes. The cumulative circumferential coverage of the guiding vanes is preferably at least 360 degrees. The pitch angle of the guiding vanes is preferably between 45 to 75 degrees. The number of the guiding vanes is preferably 6 to 16, depending on the pitch angle and aimed circumferential coverage.

The opposite side of the water outlet within the water trap area should have an edgeless, smoothly curved contour, which conforms with the rounded top end of the wall of the separating chamber. The width of the water outlet should be substantially constant or preferably it should gradually narrow in the flow direction for ensuring smooth uniform throughflow. A narrowing path ensures that the water trap stays completely filled and any trapped steam can return backwards from the wider mouth of the outlet.

Separating efficiency percentage has shown to be remarkable better than the prior art vertical separator for both water and steam phases without increasing drop of pressure.

Demisters will also have remarkably less residual water to separate from steam and their efficiency will thus increase and pressure loss there is minimized. A carefully optimized design of the separator ensures higher steam power generation compared to a boiler with conventional separators.

BRIEF DESCRIPTION OF THE DRAWINGS

Examples of embodiments of the invention will now be described in more detail with reference to the appended drawings in which.

DETAILED DESCRIPTION OF THE INVENTION

Figure 1:
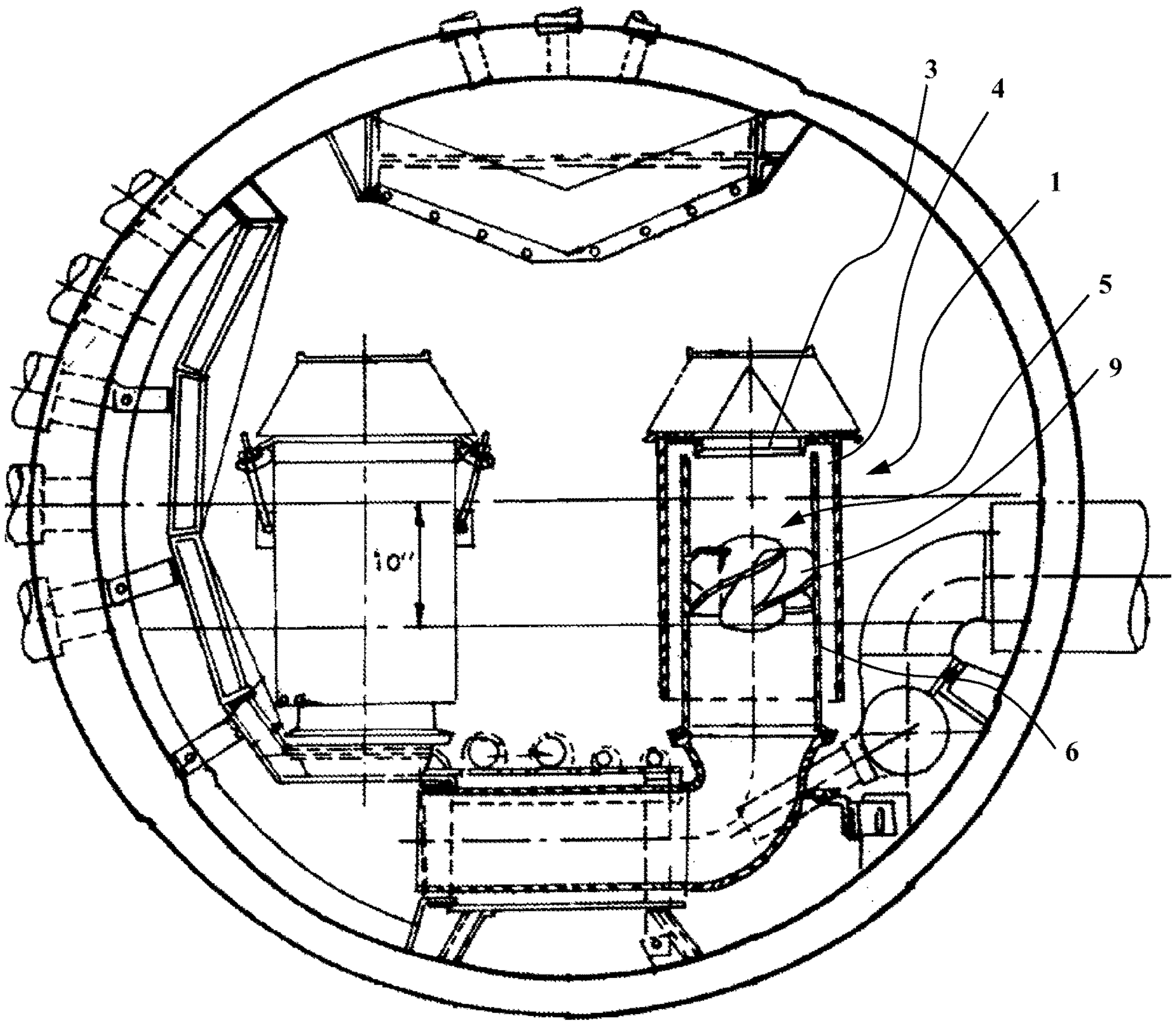
(Prior Art) Fig. 1
FIG. 1 Illustrates a prior art steam drum arrangement of a boiler.

FIG. 1 illustrates a prior art steam drum arrangement of a boiler for separating steam and water fluids coming in from cooling tubes of boiler chamber. A vertical separator 1 initially separates the incoming fluids. Several separators 1 are installed within the drum according to the capacity of the boiler. The fluid is mainly steam bubbles within water. At high levels of steam, water can also be in a form of droplets.

Primary demisters on top of the separator 1 prevent most of residual droplets entering steam space of the drum. Secondary demisters atop of the drum remove the droplets so that they do not flow out to superheater tubes. If separation efficiency is at a too low level, the demisters can be filled with water causing high pressure loss and incomplete separation.

Spiral vanes 9 within a separating chamber 5 direct incoming fluids to circular motion and separated water phase rises aside the wall 6 of the separating chamber 5 to water outlet 4. Separated water exits the separator 1 from bottom end of the water outlet 4. Steam exists through a central steam outlet 3 at the top of the separating chamber 5.

The illustrated design has several deficiencies, which cause pressure drops and incomplete separation within the separator 1. The form of water outlet 4 causes disturbances to outflowing water as incompletely separated steam can enter the water outlet 4 and may cause resonating backflow. A sharp edge at top of the wall 6 of the separating chamber 5 breaks separated flow of water to droplets, which will mix with any bursts of trapped steam flowing back from the water outlet 4. Then the droplets will exit the separator 1 via the steam outlet 3.

Figure 2:
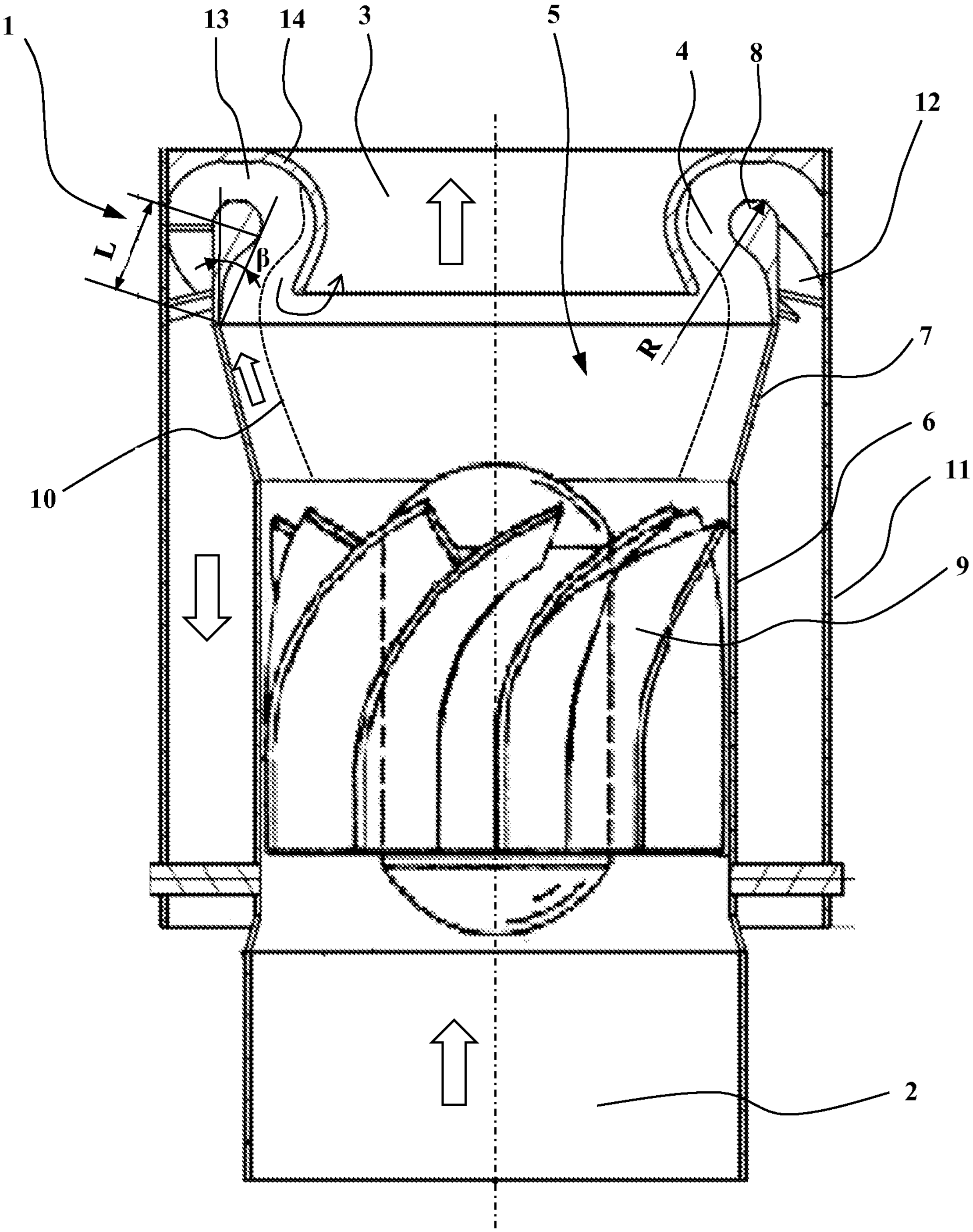
FIG. 2 illustrates a cross section of a preferred embodiment of the invention and FIG. 3 illustrates a view of guiding vanes of the embodiment of FIG. 2.

FIG. 2 illustrates a cross section of a preferred embodiment of the invention. The separator 1 has a separating chamber 5 having a fluid inlet 2 at bottom of the separating chamber 5. Spiral vanes 9 are attached to the wall 6 of the separating chamber 5 between the fluid inlet 2 and a steam outlet 3. An annular water outlet 4 surrounds the steam outlet 3. The wall 6 of the separating chamber 5 has a top section 7, which has an upwards increasing diameter on top of the section of the separating chamber 5 over the spiral vanes 9. The steam outlet 3 has bottom shape, which has upwards decreasing diameter. Top curved shape of the steam outlet 3 has upwards increasing diameter.

The water outlet 4 leads first upwards and then turns downwards atop of the water outlet 4 within an upside-down water trap 13. The top end 8 of the wall 6 of the separating chamber 5 within the water outlet 4 has a rounded contour.

The minimum radius R should be more than 8 mm and preferably over 12 mm and it doesn't need to be constant. The opposite wall of the water outlet 4 has a contour which conforms with the top end 8 of the wall of the separating chamber 5. The width of the water outlet 4 is substantially constant or narrows in the outflow direction. The top end 8 of the wall of the separating chamber 5 within the water outlet 4 is inclined inwards i.e. it has an upwards decreasing diameter. An inclination angle β from start to a point, where the wall curves outwards from an inclination line should be at least 15 degrees and the length L of the inclination should be at least 25 mm. Preferably, the form of the inclination is not straight but concave as illustrated in FIG. 2. Inward inclination also diverts inflow of water uniformly against the outer wall 14 of the water outlet and thus closes the mouth area of the water outlet 4 from free flow of steam. The inward inclination also reduces velocity locally and therefore increases static pressure of water. This enhances removal of steam out of water.

Several guiding vanes 12 are located within the water outlet 4, between the top area of the wall 6 of the separating chamber 5 and an outer wall 11 of the separator 1. The number of the guiding vanes 12 is preferably 6 to 16, more preferably 10 to 14. The cumulative circumferential coverage of the equally spaced guiding vanes 12 is preferably at least 300 degrees and most preferably over 360 degrees, so that they cover at least most of full circle.

Dashed line of surface 10 illustrates surface of water flow within the separating chamber 5 and into the water outlet 4. There should be a gap between the wall of the steam outlet 3 and the surface 10 of the water flow for avoiding water entering the steam outlet 3. The smooth and consistent flow will keep a water trap 13 at the highest area of the water outlet 4 filled, so that steam cannot enter further than the mouth of the water outlet 4. There will not actually happen relevant backflow of steam, but the path of any returning steam is illustrated by a curved arrow. The guiding vanes 12 will constrict inflow of water within the water outlet 4 so that they ensure that the water trap 13 will stay filled up. Keeping the water trap 13 filled up may also or instead be ensured, if the width of the water outlet 4 decreases enough at or after the end of the water trap 13.

Figure 3:
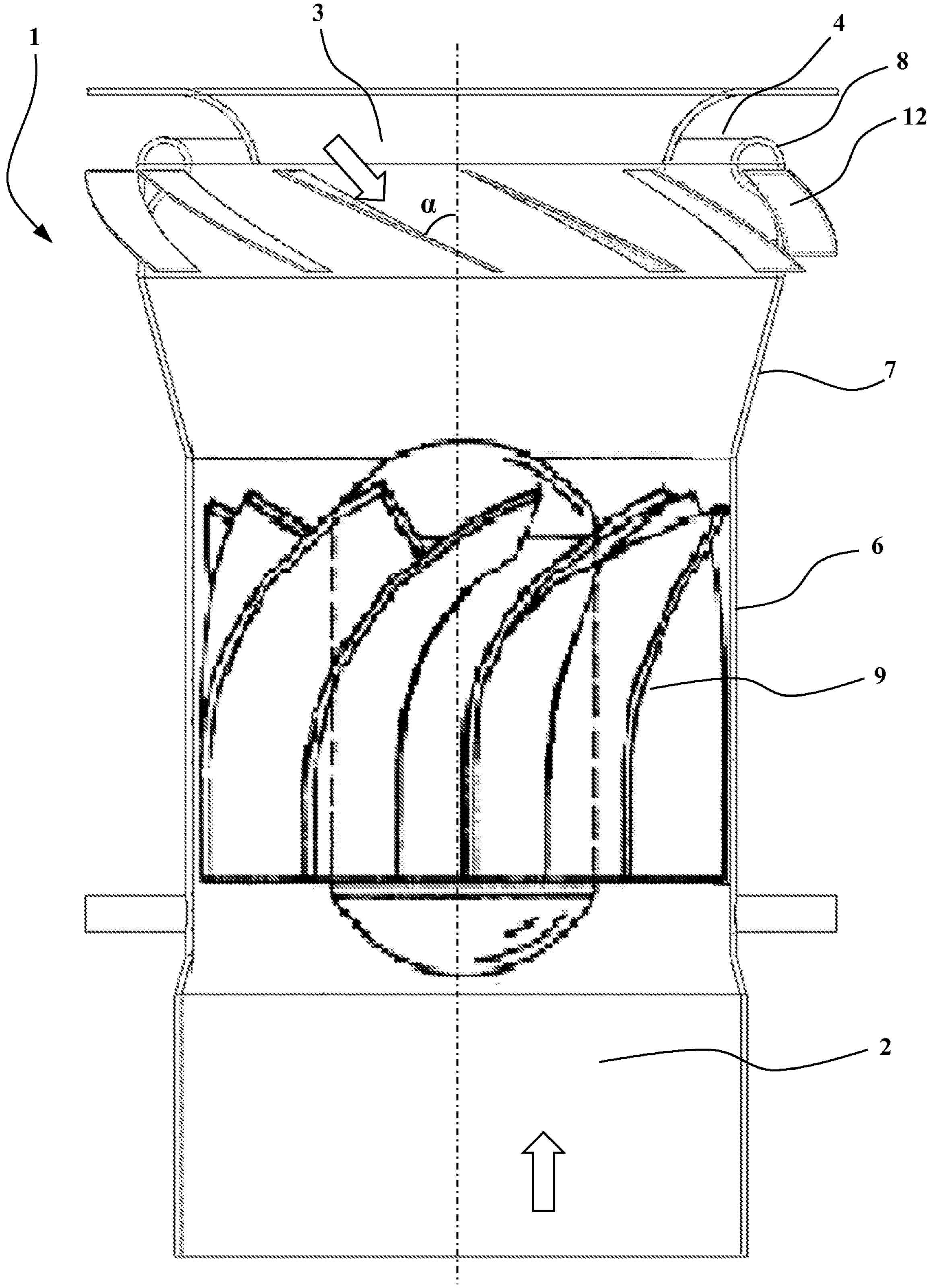

FIG. 3 illustrates a more detailed view of the guiding vanes 12 of the embodiment of FIG. 2. The pitch angle α of the guiding vanes 12 is aligned to an opposite direction than pitch angles of the spiral vanes 9. The pitch angle α of the guiding vanes 12 is preferably between 45 to 75 degrees. The arrow illustrates an approximate direction of flow of water. Increasing angle of attack of the guiding vanes 12 against the direction of flow will enhance separation of steam from water but will also increase pressure loss. If the guiding vanes 12 would be aligned to the same direction than the pitch angles of the spiral vanes 9, they would suck and intensify the inflow of water. The water trap 13 could thus be open for steam and suck it in.

The invention claimed is:

1. A separator of a boiler drum for separating steam and water, wherein the separator includes:

a separating chamber having a fluid inlet at a bottom of the separating chamber, a steam outlet at a top of the separating chamber, a water outlet passage around the steam outlet, and a wall from the bottom to the water outlet passage and extending around an interior of the separating chamber, and spiral vanes in the interior of the separating chamber and attached to the wall of the separating chamber, wherein the spiral vanes are between the fluid inlet and the steam outlet and are configured to impart a circular motion to fluids entering the separating chamber through the fluid inlet, wherein the water outlet passage leads first upwards and then turns downwards, and wherein a top end of the wall of the separating chamber includes an annular upper edge which in cross section has a rounded top contour with a minimum radius of 8 mm and the top end defines an annular inner surface of the water outlet passage, wherein the annular inner surface of the top end includes an inwardly facing lower portion curving inwardly in an upward direction to reduce a diameter of the top end; and wherein the annular inner surface includes an inwardly facing upper portion which curves outwardly in the upward direction to increase the diameter of the top end, and the upper portion is above the lower portion.

2. The separator of claim 1, wherein the lower portion is inclined radially inward by an inclination angle relative to vertical of at least 15 degrees from a start of the lower portion to a start of the upper portion, and the length of the inclination is at least 25 mm.

3. The separator of claim 1, wherein the minimum radius of the rounded top contour is at least 12 mm.

4. The separator of claim 1, wherein the lower portion of the annular inner surface is concave.

5. The separator of claim 1, further comprising an annular opposite wall which forms an outer wall of the water outlet passage and the annular opposite walls extends around the top end of the wall of the separating chamber, wherein the opposite wall is curved.

6. The separator of claim 5, wherein within the water outlet passage, between the wall of the separating chamber and the annular opposite wall, includes a plurality of guiding vanes having a pitch angle which is in angular direction opposite to a pitch angle of the spiral vanes.

7. The separator of claim 6, wherein the guiding vanes number in a range of 6 to 16.

8. The separator of claim 6, wherein a cumulative circumferential coverage of the guiding vanes is at least 300 degrees.

9. The separator of claim 6, wherein the pitch angle of the guiding vanes is in a range of 45 to 75 degrees.

10. The separator of claim 5, wherein the annular opposite wall is curved and a width of the water outlet passage is substantially constant or narrows in an outflow direction.

11. The separator of claim 1, wherein the steam outlet has a bottom which has an upwards decreasing diameter and/or a top shape having an upwards increasing diameter.

12. A separator configured for a boiler drum comprising:

a separating chamber including an annular first wall having a lower fluid inlet configured to receive fluid from the boiler drum, wherein a flow passage extends up through the annular first wall from the lower fluid inlet towards a steam outlet and an inlet to an annular water outlet passage which extends around the steam outlet, an annular top region of the annular first wall, wherein the annular top region includes an upper edge having a cross section with a radius of curvature of at least 8 mm and the annular top region is an inner wall of the annular water outlet passage;

an annular outer wall of the annular water outlet passage positioned over and at least partially enclosing the annular top region, wherein the annular outer wall includes a concave surface opposite to the annular top region and the annular outer wall extends around the steam outlet, and vanes within the separating chamber and below the annular top region, wherein the vanes are configured to impart a rotational flow to the fluid flowing from the boiler up through the separating chamber, wherein a water flow passage through the annular water outlet passage extends from the inlet, upwards towards the upper edge between an annular inner surface of the annular top region and the concave surface of the outer wall, and downward from the upper edge past an outer surface of the annular top region, and wherein an annular inner surface of the annular top region includes a lower portion which is radially inwardly facing and curves radially inwardly in an upward direction to reduce a diameter of the annular top region, and an upper portion which is radially inwardly facing, above the lower portion, and curves radially outwardly in the upward direction to increase the diameter of the annular top region.

13. The separator of claim 12, wherein and a line extending in a vertical plane along the lower portion has a length of at least 25 mm and forms an angle with respect to vertical of at least 15 degrees.

14. The separator of claim 12, wherein the annular water outlet passage includes an outer wall which with the annular top region defines the water outlet passage and the outer wall extends partially around the annular top region.

15. The separator of claim 12, wherein the annular first wall includes a frustoconical section above the vanes and below the annular top region, wherein the frustoconical section increases in diameter in an upward direction.

16. The separator of claim 12, wherein the annular top region has a shape in cross section which is bulbous with a narrow tapered lower end and a rounded upper surface, and the rounded upper shape includes the upper edge.

17. The separator of claim 12, wherein the annular water outlet passage includes guide vanes having a pitch angle opposite to a pitch angle of the vanes.

* * * * *